July 21, 1970   E. J. GOLDEN ET AL   3,521,191

"Q"-SWITCHING APPARATUS FOR A LASER DEVICE

Filed Aug. 15, 1967   2 Sheets-Sheet 1

INVENTORS
EDWARD J. GOLDEN
ROGER J. TALISH

ATTORNEY

INVENTORS
EDWARD J. GOLDEN
ROGER J. TALISH
BY
ATTORNEY

United States Patent Office 3,521,191
Patented July 21, 1970

3,521,191
Q-SWITCHING APPARATUS FOR A LASER DEVICE
Edward J. Golden, Hamburg, and Roger J. Talish, Wayne, N.J., assignors to The Bendix Corporation, a corporation of Delaware
Filed Aug. 15, 1967, Ser. No. 660,682
Int. Cl. H01s 3/00; H03b 5/30
U.S. Cl. 331—94.5                        12 Claims

ABSTRACT OF THE DISCLOSURE

A Q-switching apparatus for a laser device to periodically impair the optical path of a beam from the laser device and regulate radiation loss therein so as to delay the onset of laser oscillations for increasing the peak intensity of a laser pulse. An oscillating member having a reflector thereon in the optical path and provided with drive and pickup means to maintain oscillation of the reflector at a fixed frequency is aligned to reflect the beam to the laser for an instant of time of high stimulated emission from the laser which emission is triggered in response to the pick-up means.

BACKGROUND OF THE INVENTION

Field of the invention

This invention relates to a laser structure, and in particular to a Q-switching means for a resonant laser structure so as to discharge radiation built up in the laser material in an extremely short period of time.

Prior art of the invention

The basic structure of a laser to effect a coherent light output includes suitable reflective mirrors at opposite ends of the laser active material wherein one mirror is fully reflective at the characteristic wave length of the emitted light output of the laser and another mirror at the output end of the laser is partially reflective. For most applications, particularly in communication devices, the irregular pulsations of a laser are disturbing for use where timing and control of the intensity envelope are particularly important. The output pulse from a typical laser has an irregular intensity over a period of time of the pulse, which irregularity may be removed and the peak intensity greatly increased by regulating the regeneration in the laser.

The prior art has accomplished regeneration regulation in the laser by various apparatus including the apparatus used with an "optical maser" (the early terminology for laser) as shown and described by R. J. Collins and P. Kisliuk in FIG. 1 of an article entitled "Control of Population Inversion in Pulses Optical Masers by Feedback Modulation," Journal of Applied Physics, vol. 33, No. 6, June 1962, at page 2009, in which the reflectors of an "optical maser" were detached from the active rod and a fast moving shutter placed between the total reflector and the "maser" active material. The shutter employed was effectively a chopper wheel rotating about an axis parallel to the "maser" output axis so that a predetermined delay time after the pumping of the "maser" active material, the shutter was instantaneously opened to thereby provide instantaneous regeneration in the "optical maser." Subsequent devices evolved to make use of the high peak intensity that may be obtained by Q-switching and to concurrently attain the advantages of rapid switching, low power requirements, light weight and long life.

Further, prior art mechanical switches utilized a mirror rotating on a shaft or wheel of a motor revolving at high speeds and actuating means to synchronize the flash tube so as to optically pump a laser and cause a high stimulated emission therefrom at an instant in time when the totally reflective mirror is in perpendicular relation to the laser output axis.

The present invention overcomes disadvantages of prior art mechanical switches by providing Q-switching apparatus which is light in weight, long in life without breakdown and which is very low in power consumption (in the order of 500 milliwatts) as compared with the prior art mechanical Q-switching devices requiring a motor consuming higher power (often in the order of eight watts), and having a relatively shorter operative life, due in particular to friction caused by wear of rotating parts. Further, the mechanical Q-switching devices require excess electronic apparatus to maintain exact speed control of a rotating shaft or wheel upon which the reflector is mounted.

As compared with other methods of Q-switching, such as apparatus employed to deflect the light beam between the laser material and the reflector by the placement of a fluid cell or semiconductor device therebetween having a fluid or surface, respectively, whose indices of refraction vary in response to variations of electric and magnetic fields therein, the present invention is simple in structure and does not require electronic equipment to produce and synchronize the strength of the field in accordance with the energy emission of the laser active material.

Further, the provisions of a fixed frequency oscillatory member, in particular, the tuning fork used herein to perform the Q-switching function in combination with the means to synchronize the flash tubes according to an amplitude position of the vibrating member, permits highly accurate laser regeneration at a predetermined pulse repetition rate. The Q-switching apparatus is easily replaceable, in particular, forks of other frequencies and peak-to-peak angular amplitudes may be substituted. The forks may weigh only in the order of 10 ounces and the drive means to oscillate the tuning fork and the pick-up responsive to the oscillations is a compact unit; and, depending upon the materials used, the unit may be made for various operating temperatures, sizes, accuracy, and power requirements.

The present invention is therefore particularly appealing to use in airborne lasers because of the advantages including low power consumption, light weight and ease of substitution.

SUMMARY OF THE INVENTION

It is accordingly an object of this invention to provide a novel and simple apparatus in combination with a laser structure to perform a Q-switching function, the apparatus being easily replaceable, having low power requirements and which apparatus sustains oscillations at a constant frequency and amplitude.

A further object of this invention is to provide a Q-switching device for use with the laser optically pumped at predetermined periods of time in accordance with the position of a standard frequency oscillating member having the reflector thereon.

It is a further object of this invention to provide a tuning fork in a switching device for use with a laser and means to position the tuning fork having a reflector thereon in perpendicular relation to the laser output axis upon high stimulated emission of the laser.

These and other objects and features of the invention are pointed out in the following description in terms of the embodiments thereof which are shown in the accompanying drawings. It is to be understood, however, that the drawings are for the purpose of illustration only and are not a definition of the limits of the invention, reference being had to the appended claims for this purpose.

DESCRIPTION OF THE INVENTION

Figure 1:
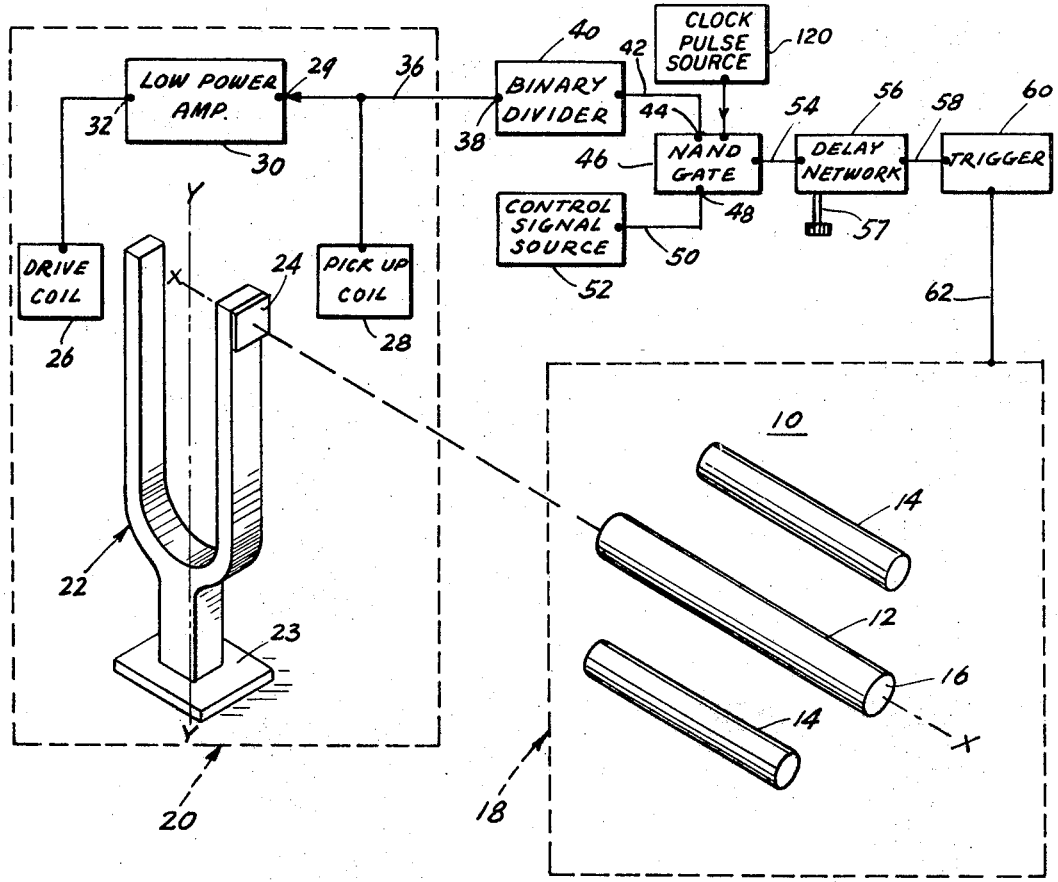
FIG. 1 is a block diagrammatic illustration of a laser system embodying the present invention.

As shown by FIG. 1, a laser cavity 10 is provided for producing coherent radiation in the light spectral range, the cavity 10 includes a laser element 12 of an active lasing material, a pumping source such as flash tubes 14, and a partially reflective dielectric mirror 16 mounted on one end of the laser element 12 in alignment with an output axis X—X of the laser element 12. The dotted line 18 of the laser cavity 10 is illustrative of a conventional double elliptical cavity wherein the inner surface of the elliptical cavity is coated with a mirrored surface and flash tubes 14 are located at foci at closed ends of the double elliptical cavity and the active laser element 12 is located at another, but common focus of each partial ellipse formed by the laser cavity 10 such that the maximum amount of the light caused by the flash tubes 14, is reflected within the cavity and upon the active laser element 12. The laser element 12 may be ruby, but preferably a host material doped with neodynium to obtain a characteristic stimulated emission wave length of 1.06 microns. The laser element 12 has at least two atomic states or energy levels among which radiative transitions can take place and in which an inverted population density condition can be created to cause the characteristic wave length of radiation. The partially reflecting dielectric mirror 16 is provided on the output end since such mirrors do not undergo the deterioration with time and use, as in the case of a silver coated mirror and characteristically have a higher reflectivity and relatively lower losses than a silver coated mirror.

The Q-switching apparatus 20 includes an oscillating member, in particular a torsional tuning fork 22 mounted in a base member 23 and upon which tuning fork 22 is mounted a dielectric mirror 24 of a type 100% reflective at the characteristic emission wave length of, for example, 1.06 microns of the active laser element 12. The tuning fork 22 has a predetermined fixed frequency of oscillation and a predetermined maximum peak-to-peak amplitude. A satisfactory tuning fork which may be used in the invention herein oscillates at a frequency of, for example, 2 kilocycles with a peak-to-peak amplitude about the Y-axis of 5°. The torsional tuning fork 22 may be provided in a variety of sizes, frequencies and peak-to-peak amplitudes and weight for the most desirable practical operation.

The torsional tuning fork 22 differs from the usual form of fork in that the tines oscillate torsionally, substantially about a longitudinal axis Y—Y instead of toward and away from the longitudinal axis of the fork. The longitudinal axis Y—Y extends perpendicular to the axis X—X of the laser element 12. The oscillation of the tuning fork 22 is caused and maintained by a drive winding and magnet illustrated in block diagram as drive coil 26 located near the tines of the fork. A pick-up winding and magnet is also provided near the tines of the fork as illustrated in block diagram form by pick-up coil 28 which is responsive to the amplitude of vibration of the tuning fork 22. As is well known in the art, tuning forks of such type being initially driven, decay in amplitude of oscillation unless maintained, although the frequency of oscillation remains substantially constant.

Thus in the present invention, in order to maintain the constant oscillation frequency and maximum peak-to-peak amplitude, an electrical signal from the pick-up coil 28 is applied to an input 29 of a low power amplifier 30 which builds up the signal until a limiting action takes place and effects an alternating current signal at output 32 in synchronism with the tine motion. Further, the oscillatory motion of tuning fork 22 may be initiated when amplifier 30 is turned on from the immediate presence of "white noise" transmitted to input 29 from pick-up coil 28. The signal from the output 32 of amplifier 30 applied to the drive coil 26 maintains the amplitude of oscillatory motion of the tuning fork 22 at a constant peak-to-peak value without amplitude decay and maintains the tuning fork 22 at its resonat frequency.

The details of a suitable torsional tuning fork 22 and the drive and pick-up means suitable for use with the tuning fork 22 in the present invention may include drive coil 26 and pick-up coil 28 and the amplifier 30 of a type such as shown and described in a U.S. Pat. No. 2,877,365 granted to F. Dostal and issued Mar. 10, 1959, for an "Electromagnetic Torsional Tuning Fork." In the invention herein, a single oscillation tine may be substituted for the pair of tines of the aforenoted patent without impairing the Q-switching function.

The alternating current signal from the pick-up coil 28 is also used in the present invention to provide a signal to synchronize the position of the mirror 24 in accordance with the lasing action. Thus, a signal is applied through line 36 to an input 38 of a conventional binary divider 40 operative to effect a pulse signal output on line 42 reduced in frequency from the alternating current signal applied from pick-up coil 28 to input 38 so as to operate within a feasible repetition range of flash tubes 14 and the laser element 12 and thereby prevent breakdown and overheating.

A pulse signal on line 42 is applied to an input 44 of a NAND gate 46 having another input 48 to which a signal is applied through a line 50 from a control signal source 52 provided to control system operation and effect a pulse signal output to a line 54 from NAND gate 46 when signals are concurrently applied to inputs 44 and 48. The pulse signal on line 54 is applied through a suitable delay network 56 which may be of a conventional type including an adjustable control or potentiometer 57 of conventional type to set the delay time of the delay network 56. The delayed signal pulse applied through the delay network 56 then effects on line 58 a pulse after a predetermined period of time which is applied to a suitable trigger circuit 60 to actuate through line 62 the flash tubes 14 in laser cavity 10.

The delay time of the delay network 56 is so set by adjustment of the conventional potentiometer control 57 as to so set or time the operation of the trigger circuit 60 and flash tubes 14 as to cause the high stimulated emission of radiation in the form of coherent light at the exact moment when the dielectric mirror 24 of the Q-switch 20 is perpendicular to the X—X output axis of the laser element 12.

MODIFIED FORM OF CONTROL NETWORK OF FIG. 2

Figure 2:
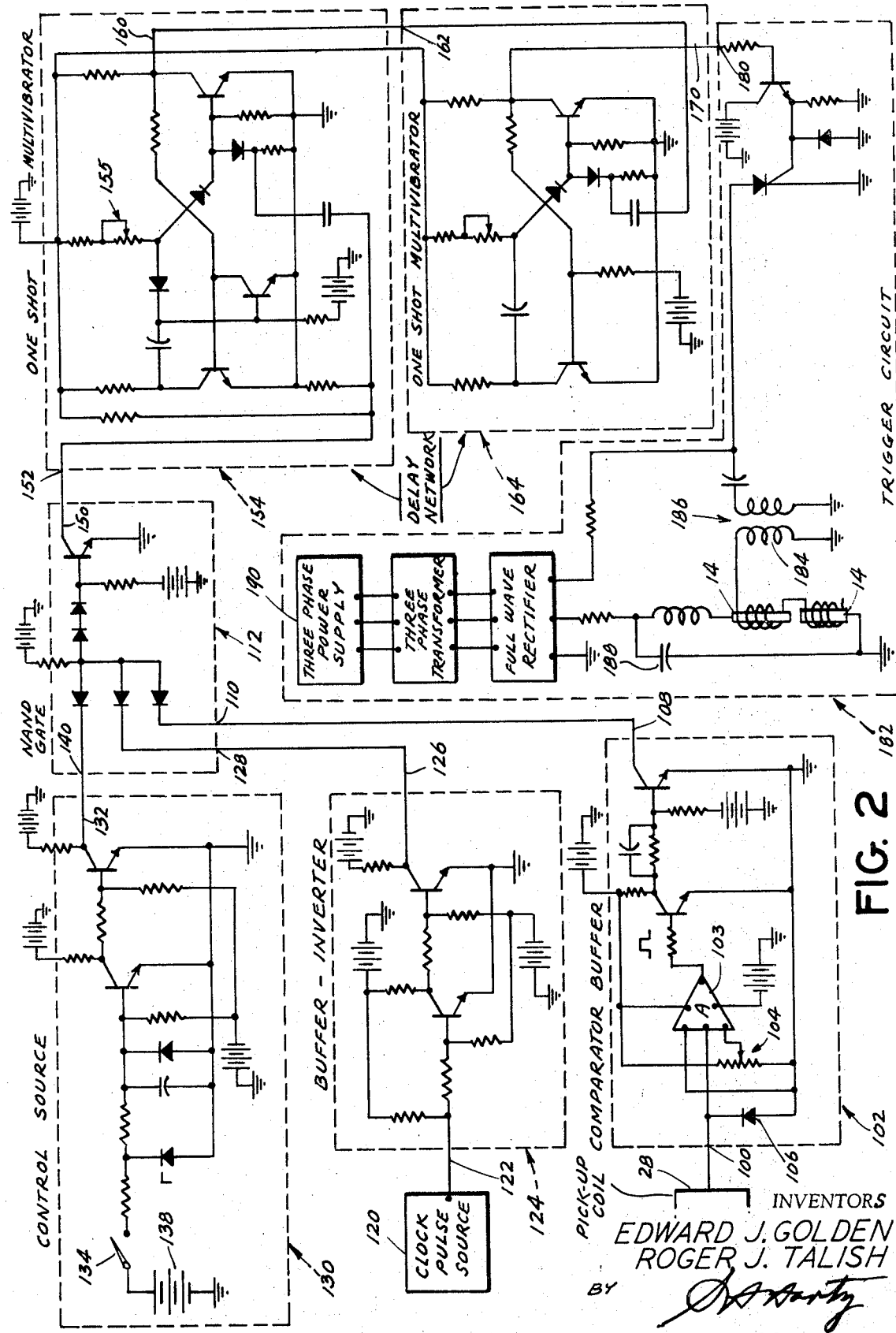
FIG. 2 is a diagrammatic illustration of a second embodiment of the present invention in which there is shown a control network with which the Q-switch tuning fork of FIG. 1 may be applied to effect lasing action at instants in time when the reflector of the Q-switch tuning fork is substantially in a plane perpendicular to the laser output axis.

FIG. 2 illustrates a second and more detailed form of a control network in which the Q-switching apparatus of FIG. 1 may be utilized. As thus applied, the control network of FIG. 2 is responsive to a signal from a pick-up coil 28 to synchronize and trigger the flash tubes 14 of FIG. 1 and thereby effect a lasing action in the laser cavity 10 shown in FIG. 1 at an instant of time when a dielectric mirror of a Q-switch, such as the dielectric mirror 24 of Q-switch 20 in FIG. 1 is in perpendicular relation to an output axis, such as output axis X—X in FIG. 1. The pick-up coil 28 and flash tubes 14 are of the type described with reference to FIG. 1.

In the control network of FIG. 2 a sinusoidal signal from the pick-up coil 28 is applied to an input 100 of a comparator-buffer network 102 illustrated in the dotted line enclosure. The comparator-buffer network includes a comparator amplifier 103 of conventional type, a suitable form of which is the μ A 710 comparator manufactured as a unit by the Fairchild Semiconductor Division of Fairchild Camera and Instrument Corporation, 313 Fairchild Drive, Mountain View, Calif. The comparator-buffer circuit 102 is provided with a potentiometer 104 adjustable to provide a threshold value so as to exclude noise signals appearing from the pick-up coil 28 to the input 100.

A diode 106 is also included in the comparator-buffer network 102 and is conductive on every other half cycle of the sinusoidal input signal fro mthe pick-up coil 28 so that the comparator-buffer network 102 effects on an output line 108 a signal of a frequency reduced by a factor of the sinusoidal input signal from the pick-up coil 28 so from the pick-up coil 28 and which signal output on line 108 is a series of positive pulses. A buffer circuit 109 is connected between comparator amplifier 103 and output line 108 and amplifies signals from comparator amplifier 103. The line 108 is connected to an input 110 of a NAND gate 112.

A clock pulse source 120 is provided to effect on an output line 122 electrical pulses at a pulse repetition frequency corresponding to the feasible repetition frequency at which the laser element 12 of FIG. 1 may be optically pumped. A suitable repetition frequency of the clock 120 is 5 pulses per second. The output line 122 is connected to a buffer-inverter network 124 shown within the dotted enclosure, which buffer-inverter network 124 is operative to provide a series of positive pulses on output line 126 of a reduced magnitude from the output pulses applied by clock 120 to the line 126, but of the same frequency as the pulse repetition frequency of the clock 120. The output line 126 is connected to a second input 128 of the NAND gate 112.

A control source 130 is provided, the circuitry of which is shown within the respective dotted enclosure, to effect on an output line 132 a constant D.C. signal level upon a control switch 134 being closed causing a current flow from battery 138. The switch 134 may be actuated by a pilot during use in an airborne laser system and the battery 138 may represent the D.C. supply source of the aircraft.

The constant direct current output on line 132 is reduced in magnitude from the voltage of the battery 138 and the signal on line 132 is applied to an input 140 of the NAND gate 112. Further, the circuitry of the control source 130 is suitable for use as the control signal source 52 in the apparatus shown in FIG. 1.

Upon signals being applied to the respective inputs 110, 128 and 140 of the NAND gate 112, the NAND gate 112 is operative to cause, on an output line 150, negative going pulses of the same frequency as the pulse frequency of the clock pulse source 120.

The output line 150 is connected to the input 152 of a first multivibrator 154 of a conventional one shot type, the circuitry of which is shown in the respective dotted enclosure.

An output line 160 leads from the multivibrator 154 and is applied to the input 162 of a second multivibrator 164 also of a conventional one shot type and the circuitry of which is shown within the respective dotted line enclosure. The multivibrators 154 and 164 are effective to cause a pulse on an output line 170 of predetermined duration, but delayed for some predetermined period of time after the time at which any pulse has appeared at the input 152 of the first multivibrator 154.

Further, the multivibrators 154 and 164 provide a suitable delay network for use as delay network 56 in FIG. 1 and the potentiometer 155 of the multivibrator 154 may be adjusted to vary and set the pulse duration of the pulses from multivibrator 154 so as to be suitable for use as the adjustable control potentiometer generally illustrated by numeral 57 in FIG. 1.

Figure 3:
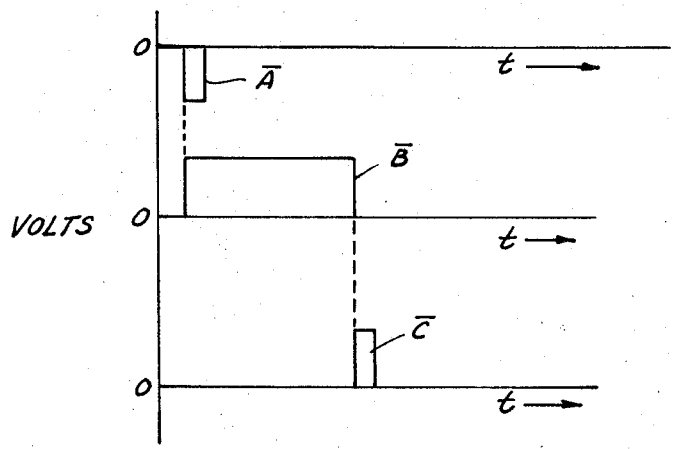
FIG. 3 is a pulse diagram showing graphically the particular effect of the delay network of FIG. 2 and which delay effect is also illustrative of the delay function of the delay network of FIG. 1.

The particular function of the one shot multivibrators 154 and 164 may be better understood by referring to the pulse diagram of FIG. 3. A negative going pulse $\overline{A}$ from NAND gate 112 is applied at input 152 of the one shot multivibrator 154 and there immediately triggers a positive output pulse $\overline{B}$ at output line 160 of a duration depending upon the design parameters of the multivibrator circuit 154. This pulse $\overline{B}$ appears immediately at the input 162 of the one shot multivibrator 164. The pulse $\overline{B}$ does not immediately trigger the one shot multivibrator 164 until the pulse $\overline{B}$ is negative going; i.e., from one magnitude to a more negative magnitude. Thus, the cessation of pulse $\overline{B}$ thereby triggers the one shot multivibrator 164 which effects a pulse $\overline{C}$ on the output line 170 from the multivibrator 164 of a duration determined by the design parameters of the one shot multivibrator 164 and at a predetermined time after the time at which the pulse $\overline{A}$ appeared at input 152 of the first one shot multivibrator 154.

The output line 170 is connected to an input 180 of a suitable trigger circuit 182, an example of which is shown within the respective dotted line enclosure and which trigger circuit 182 is responsive to the delayed pulse $\overline{C}$ delayed by the period of time dependent upon the duration of the pulse $\overline{B}$ from the initial input pulse $\overline{A}$ applied to the input 152 of the monostable multivibrator 154.

Upon the pulse appearing to the input 180 of the trigger circuit 182, a high voltage pulse is effected on the secondary 184 of the transformer 186 which operates the flash tubes 14, thereby providing a low resistance path for discharge of the capacitor 188 which is connected through suitable circuitry to a three phase power supply 190 and which capacitor 188 in the trigger circuit 182, as shown by FIG. 2, is charged prior to flashing.

In effecting lasing action and to maintain efficient operation, the laser element 12 may be optically pumped by the flash tubes 14, as shown in FIG. 1, or flash tubes 14, as shown in FIG. 2, having a repetition rate in the order of five pulses per second where the laser cavity 10 of the double elliptical structure type is used having the fixed laser element 12. Thus, the laser element 12 is optically pumped, for example, so as to cause a single high intensity pulse one time for every 500 oscillations of the torsional tuning fork 22 in a case, for example, utilizing a tuning fork 22 having a 2 kilocycle per second operation frequency.

The delay network 56 of FIG. 1 or the multivibrator 154 of FIG. 2 is adjusted then by the setting of the potentiometer control 57 of FIG. 1 or potentiometer 155 as particularly shown in FIG. 3 so that the pulse delay time therein causes flash tubes 14 of FIG. 1 or 14 of FIG. 2 to optically pump the laser material in the laser element 12 to in turn effect the high lasing action at exact instants in time when the torsional tuning fork 22 is in a perpendicular relation to the laser beam from the laser element 12.

The torsional tuning fork 22 having an oscillation frequency, as stated in the example of 2 kilocycles completes a single oscillation every ½₀₀₀ of a second and the change of the amplitude of oscillation, from a position of non-oscillation at which the dielectric mirror 24 is perpendicular to the X—X axis of the laser element, is greatest with respect to time at the point of perpendicularity of dielectric mirror 24 when torsional tuning fork 22 is driven in operation by drive coil 26 (viz—rate of change or slope of sine wave is greatest at point of crossing axis defining zero amplitude).

The intensity of the output pulse applied along the output axis X—X of the laser element 12 is well known to be a direct function of the Q-switching speed; it should therefore be evident that the invention provides a highly practical and feasible device to provide rapid Q-switching and is particularly useful in airborne laser devices where low power consumption, simplicity of design and ease of Q-switching substitution are definitely required as characteristics of the device along with accurate and high speed Q-switching to attain the high intensity output coherent light pulses as in the present invention.

While two embodiments of the invention have been illustrated and described, various changes in the form and relative arrangements of the parts, which will now appear to those skilled in the art may be made without departing from the scope of the invention. Reference is, therefore, to be had to the appended claims for a definition of the limits of the invention.

What is claimed is:

1. A laser generator comprising:
   (a) a laser element;
   (b) means associated with said laser element for pumping said laser element to produce a laser beam;
   (c) a reflector at each end of the laser element for reflecting the laser beam to the laser element;
   (d) an oscillatory member having one of the reflectors mounted thereon and moving the reflector into and out of position for reflecting the laser beam to the laser element;
   (e) means for producing signals corresponding to oscillations of the oscillaotry member;
   (f) means connected to the signal producing means and responsive to the signals therefrom for oscillating the oscillatory member; and
   (g) means connected to the signal producing means and responsive to the signals therefrom for operating the pumping means to effect lasing action in the laser element when the reflector mounted on the oscillatory member reflects the beam to the laser element.

2. The combination defined by claim 1 wherein the means for effecting lasing action includes:
   a binary divider connected to the signal producing means and operative to cause a signal at its output reduced in frequency from the signal appearing at the input thereof;
   means for delaying the reduced frequency signal for a predetermined period of time;
   a trigger operable after the delay to actuate the pumping means to effect lasing action when the reflector reflects the beam to the laser.

3. The combination defined by claim 1 wherein:
   the oscillatory member includes a torsional tuning fork to oscillate at a fixed predetermined frequency.

4. The combination defined by claim 1 wherein:
   the oscillatory member includes a torsional tine to oscillate at substantially a fixed predetermined frequency.

5. The combination defined by claim 1 wherein the means for operating the pumping means includes:
   means for producing a signal of frequency and amplitude in corresponding relation to the signal from the signal producing means corresponding to oscillations of the oscillatory member;
   a pulse source for providing a constant and low frequency series of pulses;
   control means for providing a constant level signal;
   means connected to the signal producing means, the pulse source, and the control means for gating signals therefrom to effect a pulse signal output;
   means connected to the gating means for delaying the pulse signal output from the gating means for a predetermined period of time; and
   a trigger connected to the laser element and responsive to a delayed signal from the delay means to operate the pumping means for effecting by lasing action a radiative light beam from the laser element when the reflector on the oscillatory member reflects the beam to the laser element.

6. The combination as defined by claim 5 in which the delay means further includes:
   means for varying the delay time of the delay means.

7. The combination defined by claim 5 wherein the means for producing a signal of frequency and amplitude in corresponding relation to the signal from the signal producing means includes:
   a comparator amplifier responsive to alternating current signals above a predetermined threshold value;
   means to rectify alternating current signals above the predetermined value; and a buffer connected to the gating means to amplify signals from the comparator.

8. The combination defined by claim 5 wherein the signal gating means includes:
   a NAND gate responsive to high level signals simultaneously applied at inputs thereof to effect a low level signal of frequency corresponding to the frequency of one of the high level signals.

9. The combination as defined in claim 5 wherein the delay means includes:
   a first one shot multivibrator triggered by the signal from the gating means to effect a pulse of predetermined time duration;
   a second one shot multivibrator connected to the first one shot multivibrator and responsive to the cessation of the pulse output from the first one shot multivibrator to cause a pulse output signal to be applied to the trigger to operate the pumping means for effecting lasing action in the laser element when the reflector on the oscillatory member reflects the beam to the laser element.

10. The combination defined by claim 9 wherein the first one shot multivibrator includes:
    means for producing a signal corresponding to the therein and triggered by the signal from the gating means.

11. Apparatus for increasing the peak intensity of a laser output pulse, comprising:
    a laser element;
    means associated with said laser element for pumping said element to produce a laser beam;
    a partially reflecting surface at one end of the laser element for reflecting the laser beam to the laser element;
    a torsional tuning fork having a tine which oscillates about an axis perpendicular to the laser beam;
    means for producing a signal corresponding to the amplitude of oscillation of the tine of the tuning fork;
    means responsive to the signal producing means for angularly actuating the tine of the tuning fork at substantially constant frequency and amplitude;
    a substantially total reflecting surface mounted on the tine of the tuning fork and moved into and out of position to reflect the laser beam to the laser element; and
    means responsive to a signal from the signal producing means for effecting lasing action in the laser element at a predetermined repetition rate and when the reflecting surface on the tine reflects the beam to the laser element.

12. A Q-switching device for an optically pumped laser which produces a laser beam, comprising:
    an oscillatory member;
    means for producing signals in response to the oscillations of the oscillatory member;
    means for oscillating the member in response to signals from the signal producing means;
    a reflector mounted on the oscillatory member and having a reflecting portion positioned by the oscillatory member to periodically reflect the laser beam to the laser; and
    means responsive to the signals from the signal producing means for pumping the laser to effect lasing action in the laser when the reflector on the oscillatory member has the reflecting portion thereof in a position to reflect the beam to the laser.

References Cited

UNITED STATES PATENTS 2,877,365  3/1959  Dostal.
3,315,177  4/1967  Benson _____ 331—94.5

FOREIGN PATENTS 1,082,961  9/1967  Great Britain.

RONALD L. WIBERT, Primary Examiner

P. K. GODWIN, Jr., Assistant Examiner

U.S. Cl. X.R.

331—47, 145, 156